United States Patent
Deck

(10) Patent No.: US 6,806,965 B2
(45) Date of Patent: Oct. 19, 2004

(54) WAVEFRONT AND INTENSITY ANALYZER FOR COLLIMATED BEAMS

(75) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 392 days.

(21) Appl. No.: 10/120,077

(22) Filed: Apr. 10, 2002

(65) Prior Publication Data

US 2002/0176092 A1 Nov. 28, 2002

Related U.S. Application Data

(60) Provisional application No. 60/292,726, filed on May 22, 2001.

(51) Int. Cl.[7] ................................................. G01B 9/02
(52) U.S. Cl. ...................................... 356/512; 356/515
(58) Field of Search ................................ 356/450, 512, 356/513, 514, 515, 520, 521

(56) References Cited

U.S. PATENT DOCUMENTS

| | | | |
|---|---|---|---|
| 5,457,533 A | 10/1995 | Wilcken | |
| 5,548,403 A | 8/1996 | Sommargren | |
| 5,822,066 A | 10/1998 | Jeong | |
| 5,825,476 A | 10/1998 | Abitol et al. | |
| 5,835,217 A | 11/1998 | Medecki | |
| 5,933,236 A | 8/1999 | Sommargren | |
| 5,936,720 A | 8/1999 | Neal et al. | |
| 6,559,953 B1 * | 5/2003 | Davids ........................ | 356/521 |

OTHER PUBLICATIONS

R.N. Smartt and W.H. Steel, "Theory and application of point–diffraction interferometers," Jpn. J. Appl. Phys. 14, Suppl. 351–356 (1974).

R. N. Smartt and J. Strong, "Point diffraction interferometer," J. Opt. Soc. Am. 62, 737 (1972) [Abstract Only].

Pierre M. Lane and Michael Cada, "Optical Fourier processor and point–diffraction interferometer for moving–object trajectory estimation," Applied Optics, vol. 38, No. 20, Jul. 10, 1999, pp 4308–4310.

Brochure For WYKO LADITE Laser Wavefront Measurement System.

R. G. Klaver et al., "Interferometer to measure the form figure of aspherical mirrors as used in EUV lithography," Proc. SPIE, Laser Metrology and Inspection, Vo. 3823 (1999).

"Optical Shop Testing", Chaps. 4 and 5, Ed. D. Malacara, 2nd Edition, J. Wiley & Sons, Inc.

* cited by examiner

Primary Examiner—Frank G. Font
Assistant Examiner—Andrew H. Lee
(74) Attorney, Agent, or Firm—Francis J. Caufield

(57) ABSTRACT

Interferometeric apparatus for analyzing the wavefront and intensity distribution of collimated beams from fiber optic collimators, lasers, and the like. The collimated beams are directed through a plate beamsplitter and combined with a well defined diverging, spherical reference beam preferably generated by a single mode fiber. Reference and test beams are directed through an optical assembly for changing magnification to selectively control lateral resolution at a detector plane. Phase shifting analysis is performed on the resultant interference patterns to analyze the wavefront, and intensity profile is determined as a separate step.

23 Claims, 4 Drawing Sheets

WAVEFRONT AND INTENSITY ANALYZER FOR COLLIMATED BEAMS

CROSS-REFERENCE TO RELATED APPLICATION

This application claims priority from U.S. Provisional Patent Application No. 60/292,726 filed on May 22, 2001 in the name of Leslie L. Deck and entitled "Wavefront And Intensity Analyzer For Collimated Beams", the entire contents of which are incorporated herein by reference.

BACKGROUND OF THE INVENTION

This invention in general relates to interferometric apparatus and methods for measuring the wavefront and intensity profile of collimated beams and in particular to the measurement of fiber collimators used in the telecom industry.

Many telecom components, such as switchers, add-drop multiplexers and the like, require access to a free space beam to perform their designated function. Therefore, fiber-to-free-space (collimation) devices and free-space-to-fiber (focusing) devices are required to provide access to the light carrying the information and to couple or recouple light back into the fiber. It is important for telecom component functional efficiency that the free space beam be well collimated and aberration free. An aberrated beam directly affects light to fiber coupling efficiency (commonly known as insertion loss (IL)), leading to unacceptable light loss in the component. To measure IL well, and to characterize currently manufactured collimators, a device to measure the wavefront and intensity distribution of the collimated beam to high precision is needed.

Prior art approaches to collimated beam wavefront measurement include both interferometric and non-interferometric methods. Older non-interferometric methods include the knife-edge and Hartmann tests, but these provide little information on the spatial characteristics of the wavefront or intensity distributions of the collimated beam. Shack-Hartmann sensors are probably the most common non-interferometric approach in use today, providing a modest amount of spatial information, but it is very difficult for Shack-Hartmann sensors to achieve the accuracy and resolution, in both the lateral and vertical dimensions, of interferometric approaches. On the other hand, Shack-Hartmann sensors are inexpensive and do not require coherent sources.

Prior art interferometric approaches include wavefront shearing methods, including both radial shearing and lateral shearing designs. Lateral shearing consists of splitting the test wavefront into two replicas, translating one replica laterally with respect to the first replica and interfering the two replicas. The resulting interferogram can be analyzed to measure the original wavefront. A complete wavefront measurement requires analyzing both vertical and horizontal shears. The method has the disadvantage of sensitivity based on the shear magnitude, two independent measurements that must be combined, and information loss at the wavefront boundary.

Radial shearing consists of splitting the test wavefront into two replicas, magnifying one replica and interfering the two replicas. The advantage over lateral shearing is that image magnification is easy to do optically and only one shear measurement is required. The disadvantages include sensitivity based on the magnification factor and poor sensitivity near the magnification origin. Often, the image magnification factor used is high enough to produce an effectively plane reference wavefront. Both of these approaches can operate with incoherent beams by utilizing an equal path Mach-Zehnder design.

The use of a small area (point-like) apertures or disks to produce reference wavefronts from a diffraction limited point source is known. Here, the reference diffraction spot is produced from the test wavefront by focusing the test wavefront onto a pinhole.

R. G. Klaver, et al. in a paper entitled "Interferometer to measure the form figure of aspherical mirrors used in EUV lithography," Proc. SPIE, *Laser Metrology and Inspection*, Vol. 3823 (1999) describe an instrument using no bulk optical components to recombine the beams However, this instrument cannot measure collimated wavefronts, and has poor lateral resolution. It requires the use of two fiber tips to act as light beams with known wavefront characteristics. One beam interacts with the optic under test and its wavefront is modified by said optic. The other beam interferes with this modified wavefront, and the interference is analyzed to extract the characteristics of the optic under test.

Accordingly, there continues to be a need for an instrument of simple and inexpensive architecture for analyzing the wavefront and intensity profile of collimated beams, and it is a primary object of this invention to satisfy this need.

Another object of this invention is to provide apparatus and methods by which the wavefront and intensity profile of collimated beams may be measured with high lateral resolution.

Yet another object of this invention is to provide easily aligned apparatus for analyzing the wavefront and intensity profile of collimated beams.

Still another object of the invention is to provide collimated beam wavefront and intensity analyzers that are highly accurate and repeatable.

Yet another object of the invention is to provide collimated beam wavefront and intensity analyzers having minimal optical components.

Another object of the invention is to provide collimated beam wavefront and intensity analyzers having perfectly known reference wavefronts.

Other objects of the invention will, in part, be obvious and will, in part, appear hereinafter when the description to follow is read in conjunction with the drawings.

SUMMARY OF THE INVENTION

The invention consists of an interferometric apparatus and method for measuring collimated test beams. A diverging reference beam is provided and a single bulk optic for combining the collimated and reference beams, preferably in the form of a plate beamsplitter. The reference beam is produced by light emitted from the tip of a single mode optical fiber fed by the same source as is used to generate the test beam. The beamsplitter combines the light from the test and reference beams to produce an interference pattern. The interference pattern is directed through an optical assembly to magnify the region of interference to increase lateral resolution and thereafter onto an detector, preferably of two dimensions, or areal. Means are provided for translating the end of the single mode fiber from which the reference beam emanates or the device under test along the optical axis to enable phase shifting interferometric analysis. Alternatively, phase shifting via wavelength-tuning may be employed.

Analyzing the areal detector data acquired while phase shifting determines the wavefront of the collimated test beam since the reference wavefront shape is known. Apparatus to control the intensity and/or polarization of the beams is provided to facilitate the determination of the intensity profile of the test beam.

In an alternate aspect of the invention, the interference pattern is formed in the plane of a diffusing surface carried on a rotating diffuser disk and is thereafter imaged by a zoom camera for purposes of adjusting magnification to control lateral resolution.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION OF THE INVENTION

This invention relates to interferometric apparatus and associated methods for analyzing the wavefront and intensity profile of collimated beams as generated, for example, by fiber optic collimator assemblies, lasers, and the like.

Figure 1:
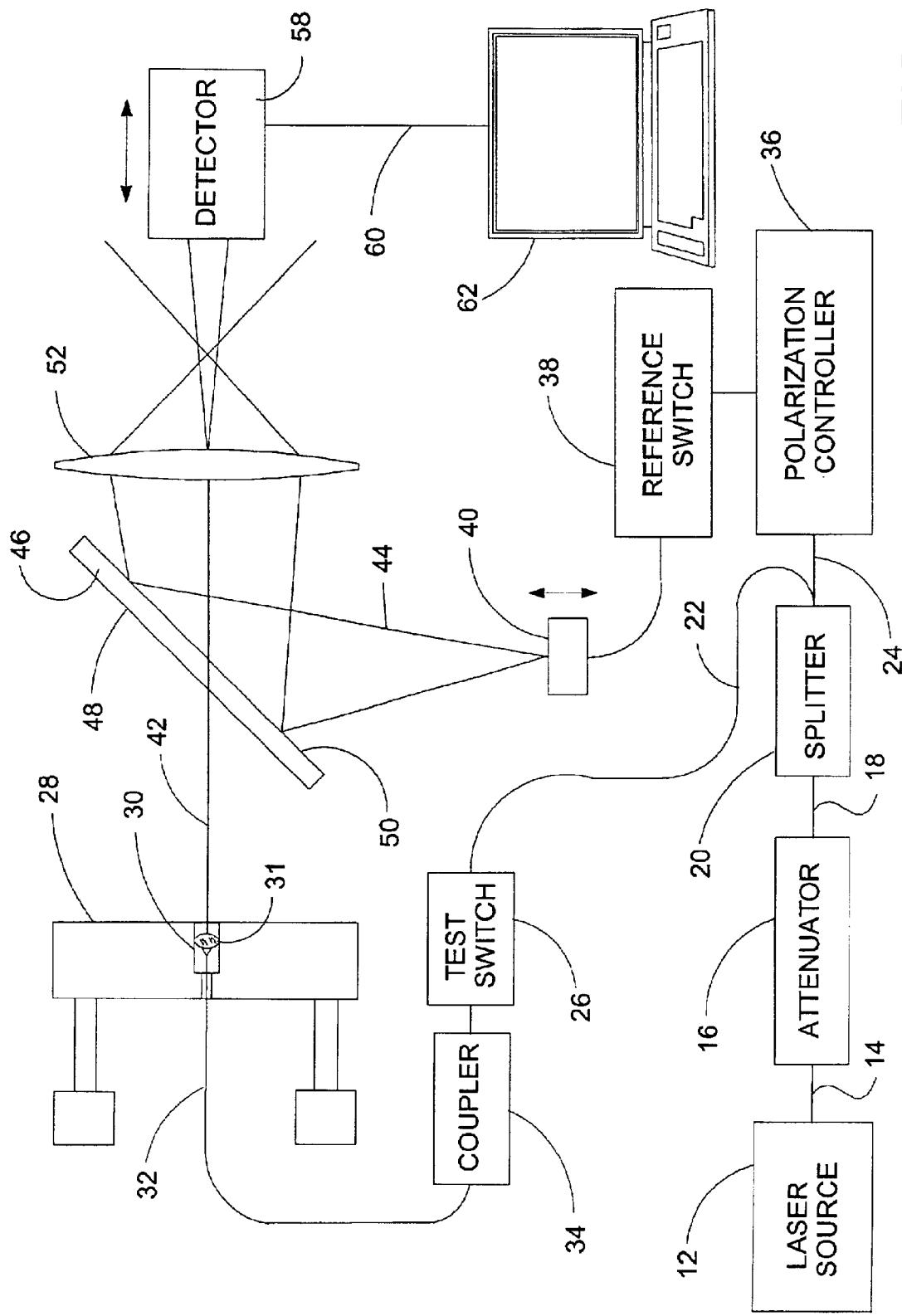
FIG. 1 is a diagrammatic elevational view of the invention shown configured to measure the wavefront and intensity profile of a fiber optic collimator assembly.

The inventive interferometric apparatus for measuring the characteristics of fiber collimators is shown in FIG. 1 where it is designated generally as the system 10. The major components of system 10 comprise a laser light source 12, splitter 20, X-Y, tilt and tip stage 28 for mounting and aligning a test collimator 30, a plate beamsplitter 46 for combining test and reference beams, an optical system 52, in illustrated form a simple lens, a detector 58, and a computer system 62 supplied with suitable software for performing analytical and housekeeping functions.

Laser light source 12 provides the beam requirements for system 10 by generating an output beam 14 at the operating wavelength of the device under test, typically, but not necessarily, at 1.55 micrometers (1550 nm). Beam 14 is fed to an attenuator 16 having a single mode output fiber 18 for propagating light from beam 14 for further downstream use. Attenuator 16, whose purpose is to control the intensity of light available to the remainder of system 10, may be of the variable aperture type or may be based on an arrangement for selectively mismatching the numerical apertures (NAs) of fiber 18 with an upstream fiber to which light from beam 14 has been coupled.

The light propagating along single mode fiber 18 is fed into splitter 20 which has output branches 22 and 24 in the form of single mode fibers, which typically are not polarization maintaining. Splitter 20 is preferably an evanescent field type of coupler that operates to selectively split incoming light with a predetermined ratio (typically 99:1) into the two single mode fibers, 22 and 24, respectively. The two single mode fibers 22 and 24 are used to feed the reference and test legs of interferometric system 10 in a manner that will be more evident hereinafter.

Most of the light from splitter 20 is directed into fiber 24 and subsequently is used to provide a reference beam for system 10. As will subsequently be appreciated, only a fraction of the reference beam interferes with the test beam, so it is necessary to place most of the available beam energy for travel in fiber 24. Fiber 22 serves as the light source for the collimator under test 30.

Both fibers, 22 and 24, pass through switches (a reference and test switch) so as to have individual control of the light intensity exiting them. The switch for fiber 22 is switch 26, and for fiber 24, it is switch 38. Switch 26 and 38 are preferably well-known optical type switches.

Polarization controller 36 is placed in the path of fiber 24 to selectively vary the plane of polarization of the reference beam to optimize the signal available in the interferogram subsequently formed. However, it will be recognized that polarization controller 36 can be used for the same purpose if placed in the path of fiber 22.

A collimator under test 30 is connected to the test fiber 22 via a butt coupler 34 arranged on the output end of test switch 26 and is fixtured to stage 28. Stage 28 is provided with fine adjustments for motion control in X and Y and rotation about these axes. Stage 28 may also be selectively translated along the optical axis to facilitate phase shifting interferometric analysis.

Figure 2:
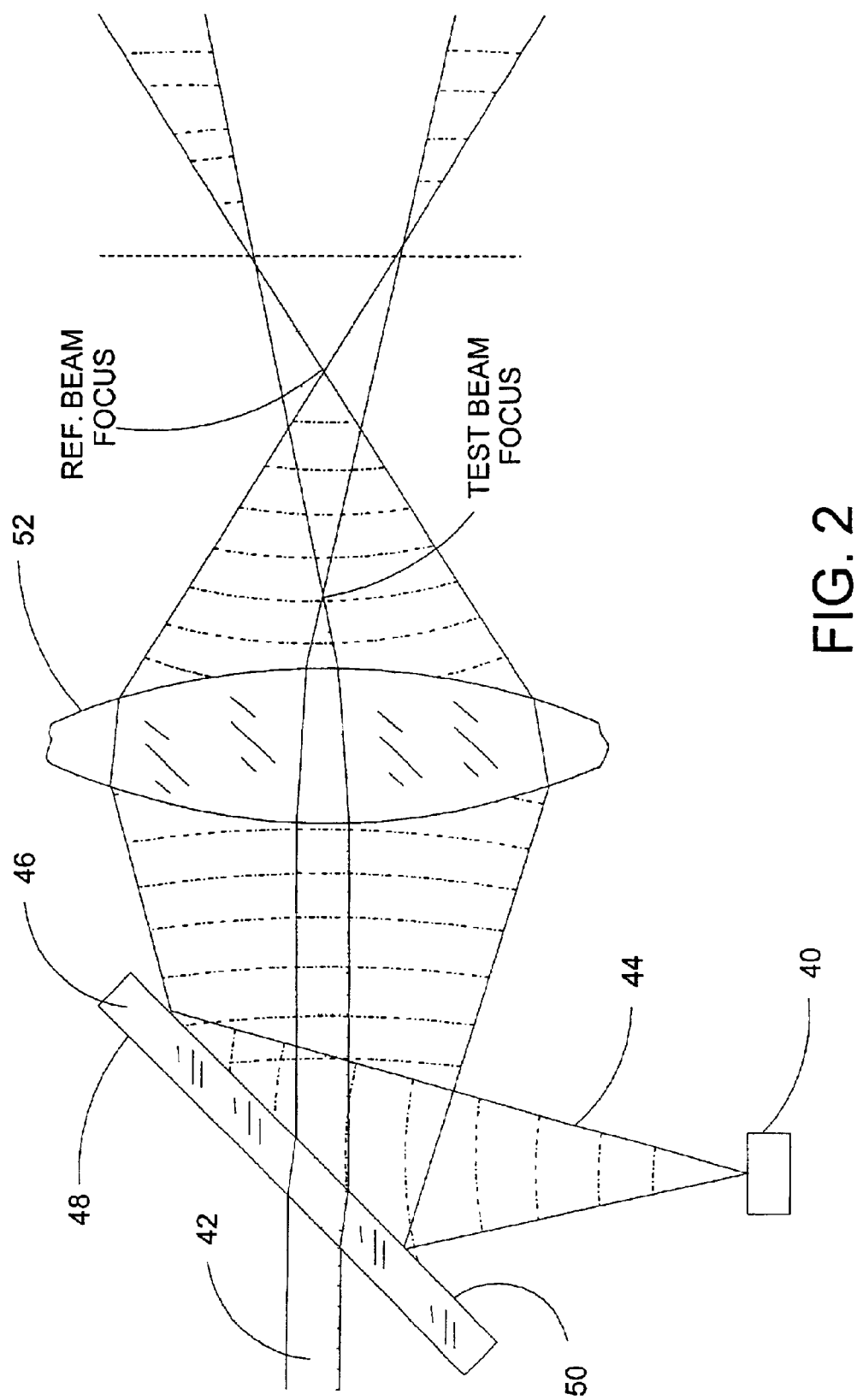
FIG. 2 is an enlarged diagrammatic view of a portion of FIG. 1.

As is well-known, fiber collimators such as that designed at 30 typically comprise a collimator lens 31 with the cleaved end of a single mode fiber 32 positioned at or near its focal point to generate a collimated beam 42 that typically generates a train of plane waves and otherwise has a Gaussian intensity distribution (See FIG. 2). It is the purpose of this invention to analyze the quality of the wavefront and intensity profile of beam 42, and thus, its state of collimation.

The endface of the collimator 30 is preferentially situated at the axis of rotation of the stage 28—about X and Y As already mentioned, the stage 28 can also can be moved along the Z-direction (the optical axis). In this manner, the output beam 42 can be selectively aimed at detector 58 to be aligned therewith.

Fiber 32 terminates in a ferrule that is highly polished to have a flat mating surface so that it can precisely be aligned for optimal coupling efficiency with a corresponding ferrule provided in butt coupler 34.

The output beam 42 of the collimator under test is directed through a 50% reflecting, preferably parallel plate beamsplitter 46, then through lens 52, and finally onto detector 58, which is mounted for selective longitudinal motion along the optical axis to change magnification to control lateral resolution of system 10.

Reference fiber 24 is held in a ferrule 40 that may be moved vertically, toward and away form beamsplitter 46. The endface of the reference fiber 24 is cut and polished flat so as to produce a beam with a diffraction limited, spherically divergent wavefront 44 of known radius of curvature. The output 44 of reference fiber 24 is reflected off the rear surface 50 of beamsplitter 46 after which it is directed to the lens 52 and ultimately toward detector 58.

The first surface encountered by the reference wavefront 44 as a divergent beam is the reflecting surface 50 of the beamsplitter 46. The other surface of the beamsplitter 46, surface 48, contains an anti-reflection coating, and if desired, can be angled with respect to 45°. This beamsplitter configuration minimizes beamsplitter induced optical aberrations because only collimated light passes through the beamsplitter 46. Thus, the beamsplitter is arranged with respect to the beams being combined so that the nominally collimated test beam is incident to the front surface and is transmitted through the back surface while the reference beam is reflected off the back surface to minimize distortion in the interference pattern generated later on. If necessary, beamsplitter 46 can be provided with a slight wedge and the incidence angle of collimated beam 42 can be varied to further control distortion.

Interference between the reference and collimated beams, 42 and 44, occurs over a small region of interference at the detector 58, which corresponds to the use of only the paraxial region of lens 52 provided detector 58 is placed far enough away for this purpose. When the detector 58 is spaced properly, the full available test beam 42 can be made to overlap with a corresponding portion of the reference beam 44 and is captured by the detector 58. This is evident from the enlargement of FIG. 2, which illustrates the convergences and divergences of both test and reference beams before and after lens 52. By moving the detector 58 along the optical axis, it should be clear that it is possible to change the apparent width of the interfering fringes as seen by detector 58 and the degree of overlap of the test and reference beams to control lateral resolution. It should also be evident that using only the paraxial region of lens 52 avoids introducing artifacts into the wavefronts that would otherwise be present if a larger region were used. This is also dependent on test beam size, which is typically around 1.5 mm. Those skilled in the art will appreciate that a diverging lens may be used in place of the converging lens 52 as illustrated, and reflective equivalents may also be used. It will also be evident that detector 58 may be in the form of a linear array or single detector where a scanning embodiment would be appropriate.

The polarization controller 36, which may be placed on either the reference or test fiber, allows the interference fringe contrast to be maximized. After the lens 52, both beams are divergent, allowing magnification changes by moving the detector 58 along the optical axis as already explained.

Phase shifting is preferably performed by translating the end of fiber 24 from which reference beam 44 emanates or by translating stage 28 along the optical axis with a piezo-electric transducer, or by wavelength tuning of source 12 or some combination of both.

The wavefront of the collimated beam is determined by an analysis of the phase-shifted detector data which is fed via detector output line 60 to computer 62. Any standard phase-shifting analysis algorithm can be used with the apparatus. For example, the phase shifting techniques described in U.S. Pat. No. 5,473,434 may be used, and the contents of that patent are incorporated herein by reference in their entirety as an example of applicable phase shifting techniques for implementing this aspect of the invention. Since the reference wavefront of beam 44 is not flat, its shape must be subtracted from the measured wavefront of beam 42, which is nominally planar, to obtain the true test wavefront. Since the radius of curvature of wavefront 44 is well defined, this process is readily handled with a suitable algorithm. Using these procedures, it has been found that precisions of $\lambda/1000$ are possible in the measurement of wavefront error.

The wavefront from a single mode fiber is a perfect sphere with an angular divergence dependent on the fiber characteristics. It is most convenient, thus, to use a lens with minimum aberration for 1:1 conjugate imaging. A biconvex lens with a focal length of half the separation between the reference fiber tip and the lens works well. The power of the optical system is so slow that wavefront aberrations introduced by the lens are negligible since only the paraxial region of the lens is being used.

System 10 can also be used to measure the intensity profile of the test beam 42. This can be accomplished in two ways. In both methods, two additional data sets are required. The most straightforward method involves first taking data with both switches 26 and 38 turned off. This data set is called the background measurement and measures the spatial distribution of the detector pedestals. The other data set is obtained after just the test switch 26 is turned on. The difference between the test data set and the background is a direct measure of the intensity profile.

In the other method, a background data set is also acquired, but the second data set is obtained with the reference fiber switch 38 on and the test fiber switch 26 off to measure the spatial distribution of reference light at the detector 58. This data set, in conjunction with the interference data set, can be used to determine the test beam intensity profile by suitable manipulation of the resultant data.

Figure 3:
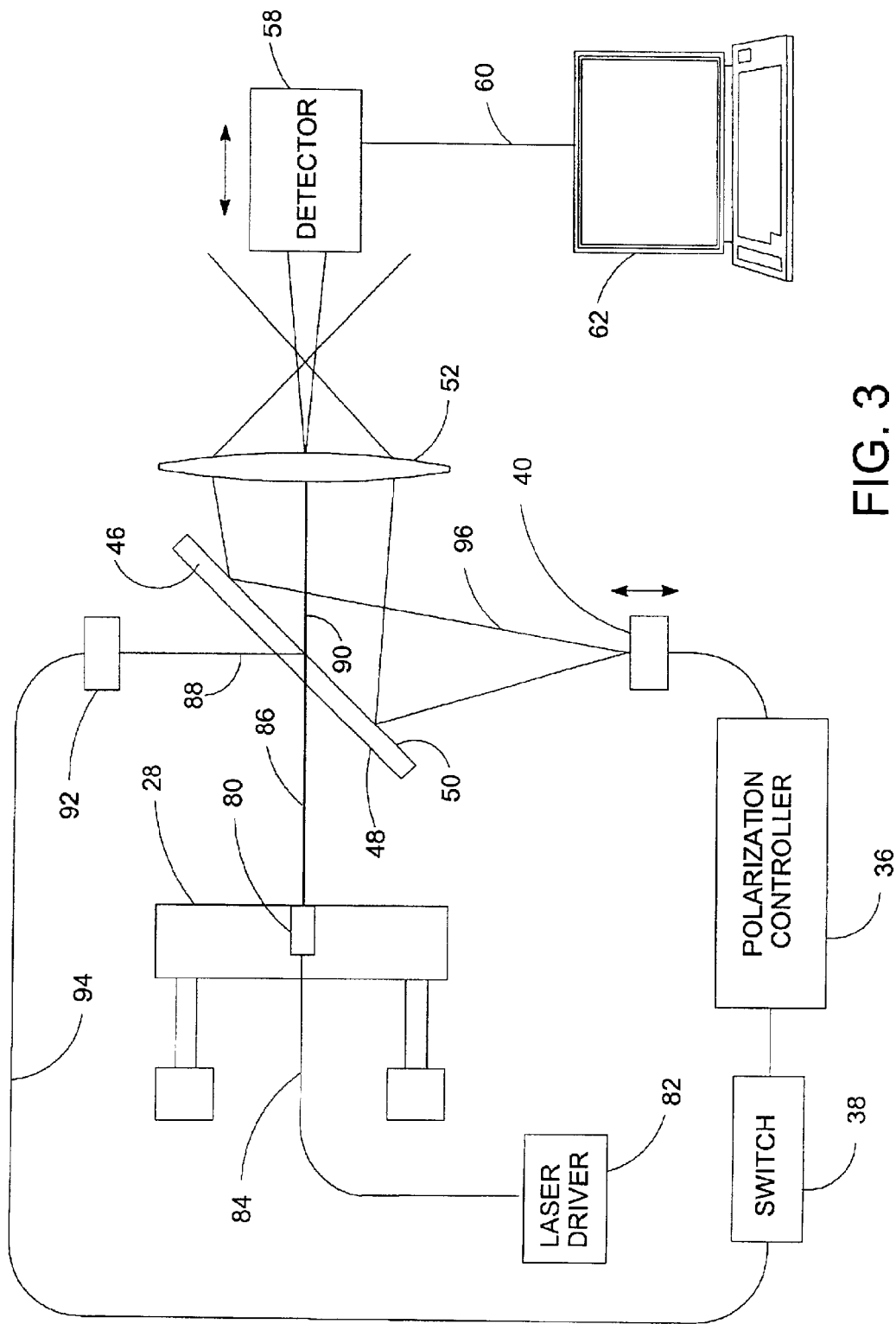
FIG. 3 is a diagrammatic elevational view of another embodiment of the invention configured to measure the wavefront and intensity profile from a laser.

FIG. 3 illustrates the interferometric apparatus of the invention configured to measure the wavefront and intensity characteristics of collimated lasers such as that designated at 80. Laser 80 is mounted on X-Y, tip/tilt stage 28 as before and is driven by a suitable laser driver 82 via line 84 to produce a nominally collimated beam 86 having a nominally plane wavefront and a Gaussian intensity distribution. Laser output beam 86 is split by the beamsplitter 46 at its rear surface 50, and the beam which is normally discarded, beam 88, is instead coupled into a single mode fiber 94 through a fiber coupler 92. The output end of fiber 94 is polished flat, and the diverging, spherical light beam 96 emerging from it is directed onto the beamsplitter back surface 50 to be used as the reference beam. Polarization and intensity controls (36 and 38) are provided as shown to enable high quality measurements of wavefront and intensity distributions in a manner similar to that used for the fiber collimator measurements as described hereinabove with reference to FIGS. 1 and 2.

Figure 4:
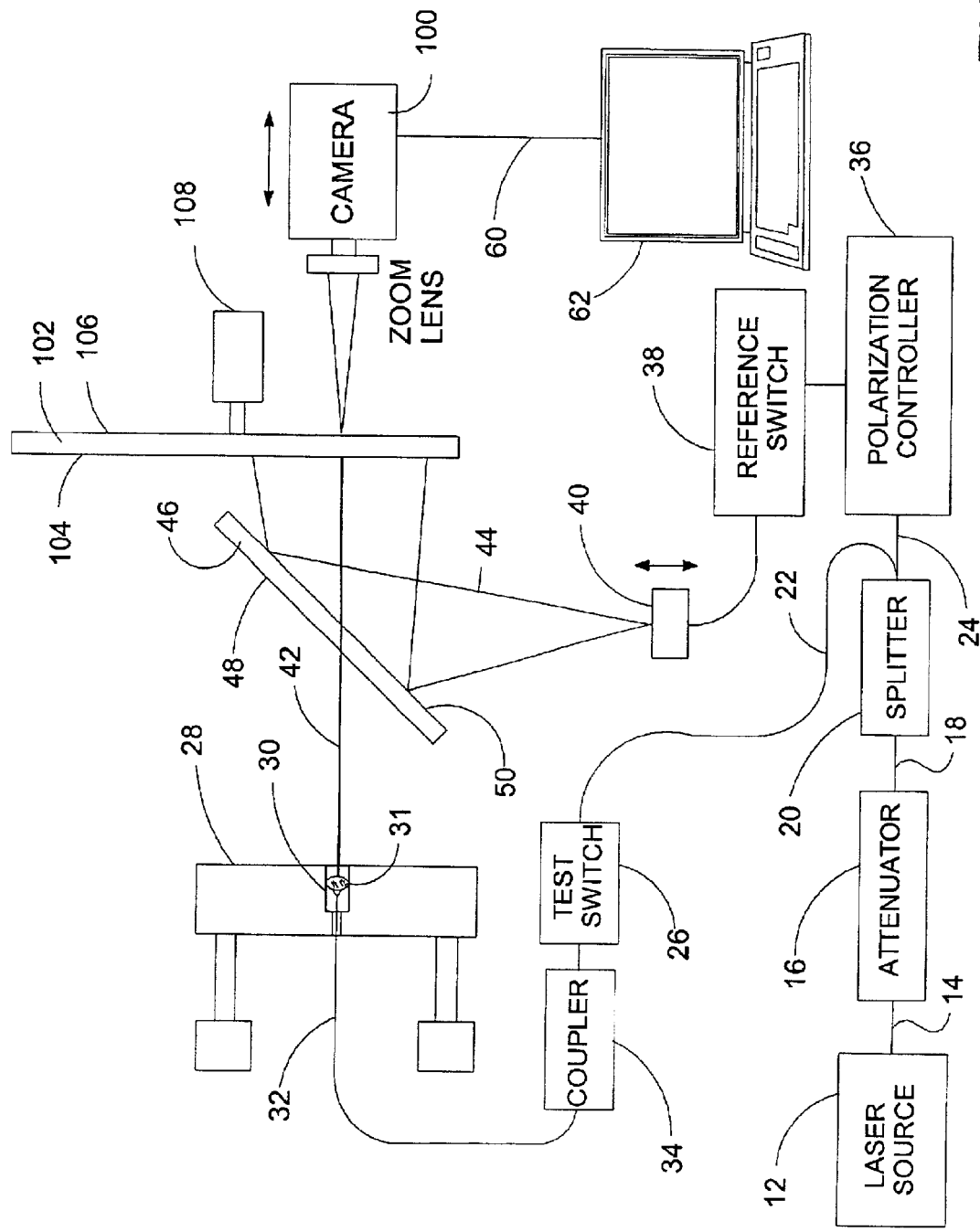
FIG. 4 is a diagrammatic elevational view of an alternative embodiment where the interference pattern is formed on a rotating diffuser and imaged via a zoom camera.

Another embodiment of the invention is shown in FIG. 4, which is a modified form of system 10 of FIG. 1. This embodiment has many elements in common with those of FIG. 1, and these are identified by the same numerals in FIG. 4 as were used to identify them in FIG. 1. The embodiment of FIG. 4 differs from that of FIG. 1 by the means by which magnification, and thus, lateral resolution are controlled. In this embodiment, there is no lens corresponding to the lens 52 and detector 58 has been replaced by a zoom camera 100. Here, optical system 58 has been replaced by a diffuser disk 102 rotated by a motor 108. Diffuser disk 102 has a diffusing surface 104 facing beamsplitter 46 and an antireflection coated rear surface 106. Here, the interferogram is formed on the diffusing surface 104 which is resident in a fixed longitudinal plane along the optical axis. The focus of camera 100 is maintained on this plane to image the interferogram onto its internal area detector. The magnification of the image of the interferogram is controlled by the zoom lens effective focal length, which may be selectively changed to alter lateral resolution. Thus, rotating diffuser disk 102 defines an image plane and operates to reduce coherent artifacts that would otherwise be present. The zoom lens of camera 100 preferably is provided with a small NA so that the thickness of diffuser disk 102 is not distorted as seen by camera 100.

Based on the teachings and described embodiments of the invention, other variations of the invention will be evident to those skilled in art. Accordingly, such changes are considered to be within the scope of the invention.

What is claimed is:

1. Interferometric apparatus for analyzing collimated beams, said apparatus comprising:

means for mounting and aiming a test device adapted to generate a nominally collimated test beam to be analyzed;

means for generating a spherical diverging reference beam;

a bulk optic element for combining said nominally collimated test beam and said reference beam for travel along a common path;

an optical assembly for receiving said nominally collimated test beam and said reference beam as they travel along said common path and producing an interference pattern containing information about the shape of the wavefront of said nominally collimated beam;

means for detecting the intensity variation over said interference pattern and generating an electrical signal indicative of said information; and analytical means for receiving said electrical signal and determining the shape of said wavefront.

2. The interferometric apparatus of claim 1 wherein said bulk optic element for combining said nominally collimated test and reference beams comprises a single plate beamsplitter.

3. The interferometric apparatus of claim 2 wherein said plate beamsplitter comprises a front surface and rear surface and is arranged so that said nominally collimated test beam is incident to said front surface and is transmitted through said back surface and said reference beam is reflected off said back surface to minimize distortion in said interference pattern.

4. The interferometric apparatus of claim 1 wherein said means for generating said spherical diverging reference beam at least in part comprises a laser light source and a single mode optical fiber optically coupled to said laser light source.

5. The interferometric apparatus of claim 1 wherein said optical assembly is adapted to diverge both said nominally collimated test and reference beams.

6. The interferometric apparatus of claim 5 wherein said optical assembly comprises at least one element selected from the group consisting of positive lenses, negative lenses, and reflecting elements.

7. The interferometric apparatus of claim 5 wherein said means for detecting the intensity variation over said interference pattern comprises a detector that is mounted for longitudinal motion with respect to said diverging nominally collimated test and reference beams to change the magnification of the interference pattern falling on said detector to control the lateral resolution of said interferometric apparatus.

8. The interferometric apparatus of claim 1 further including means for selectively introducing phase shifts in said interference pattern for subsequent phase shifting analysis.

9. The interferometric apparatus of claim 1 wherein said optical assembly comprises a diffusing disk mounted for rotatory motion in a fixed plane after said bulk optic element and wherein said interference pattern is formed on a surface of said diffusing disk.

10. The interferometric apparatus of claim 9 wherein said means for detecting the intensity variation over said interference pattern comprises a zoom camera focused on said interference pattern and adjustable in focal length to change the magnification of said interference pattern to control the lateral resolution of said interferometric apparatus.

11. The interferometric apparatus of claim 1 wherein said nominally collimated test beam and said reference beam are generated from a common laser source having a wavelength that is at the operating wavelength of a test device.

12. The interferometric apparatus of claim 1 further including a switching arrangement for selectively turning off said reference and test beams so that the intensity of said interference pattern varies in accordance with only that of said nominally collimated test beam and said analytical means is further configured to determine the intensity profile thereof.

13. Interferometric apparatus for analyzing collimated beams, said apparatus comprising:

means for mounting and aiming a test device adapted to generate a nominally collimated test beam to be analyzed;

bulk optic means for picking off a portion of said nominally collimated test beam, generating a spherical diverging reference beam, and combining said nominally collimated test beam and said spherical diverging reference beam for travel along a common path;

an optical assembly for receiving said nominally collimated test beam and said spherical diverging reference beam as they travel along said common path and producing an interference pattern containing information about the shape of the wavefront of said nominally collimated beam;

means for detecting the intensity variation over said interference pattern and generating an electrical signal indicative of said information; and analytical means for receiving said electrical signal and determining the shape of said wavefront.

14. The interferometric apparatus of claim 13 wherein said bulk optic means comprises a single plate beamsplitter.

15. The interferometric apparatus of claim 14 wherein said plate beamsplitter comprises a front surface and rear surface and is arranged so that said nominally collimated test beam is incident to said front surface and is transmitted through said back surface and said reference beam is reflected off said back surface to minimize distortion in said interference pattern.

16. The interferometric apparatus of claim 13 wherein said means for generating said spherical diverging reference beam at least in part comprises a single mode optical fiber optically coupled to said portion of said nominally collimated test beam.

17. The interferometric apparatus of claim 13 wherein said optical assembly is adapted to diverge both said nominally collimated test and reference beams.

18. The interferometric apparatus of claim 17 wherein said optical assembly comprises at least one element selected from the group consisting of positive lenses, negative lenses, and reflecting elements.

19. The interferometric apparatus of claim 17 wherein said means for detecting the intensity variation over said interference pattern comprises a detector that is mounted for longitudinal motion with respect to said diverging nominally collimated test and reference beams to change the magnification of the interference pattern falling on said detector to control lateral resolution of said interferometric apparatus.

20. The interferometric apparatus of claim 13 further including means for selectively introducing phase shifts in said interference pattern for subsequent phase shifting analysis.

21. The interferometric apparatus of claim 13 wherein said optical assembly comprises a diffusing disk mounted for rotatory motion in a fixed plane after said bulk optic element and wherein said interference pattern is formed on a surface of said diffusing disk.

22. The interferometric apparatus of claim 21 wherein said means for detecting the intensity variation over said interference pattern comprises a zoom camera focused on said interference pattern and adjustable in focal length to change the magnification of said interference pattern to control the lateral resolution of said interferometric apparatus.

23. The interferometric apparatus of claim 13 further including a switching arrangement for selectively turning off said reference and test beams so that the intensity of said interference pattern varies in accordance with only that of said nominally collimated test beam and said analytical means is further configured to determine the intensity profile thereof.

* * * * *